March 23, 1965     R. M. NIEDZIELSKI ETAL     3,175,073
SPLIT STREAM CROSS ORIFICE
Filed Nov. 5, 1963
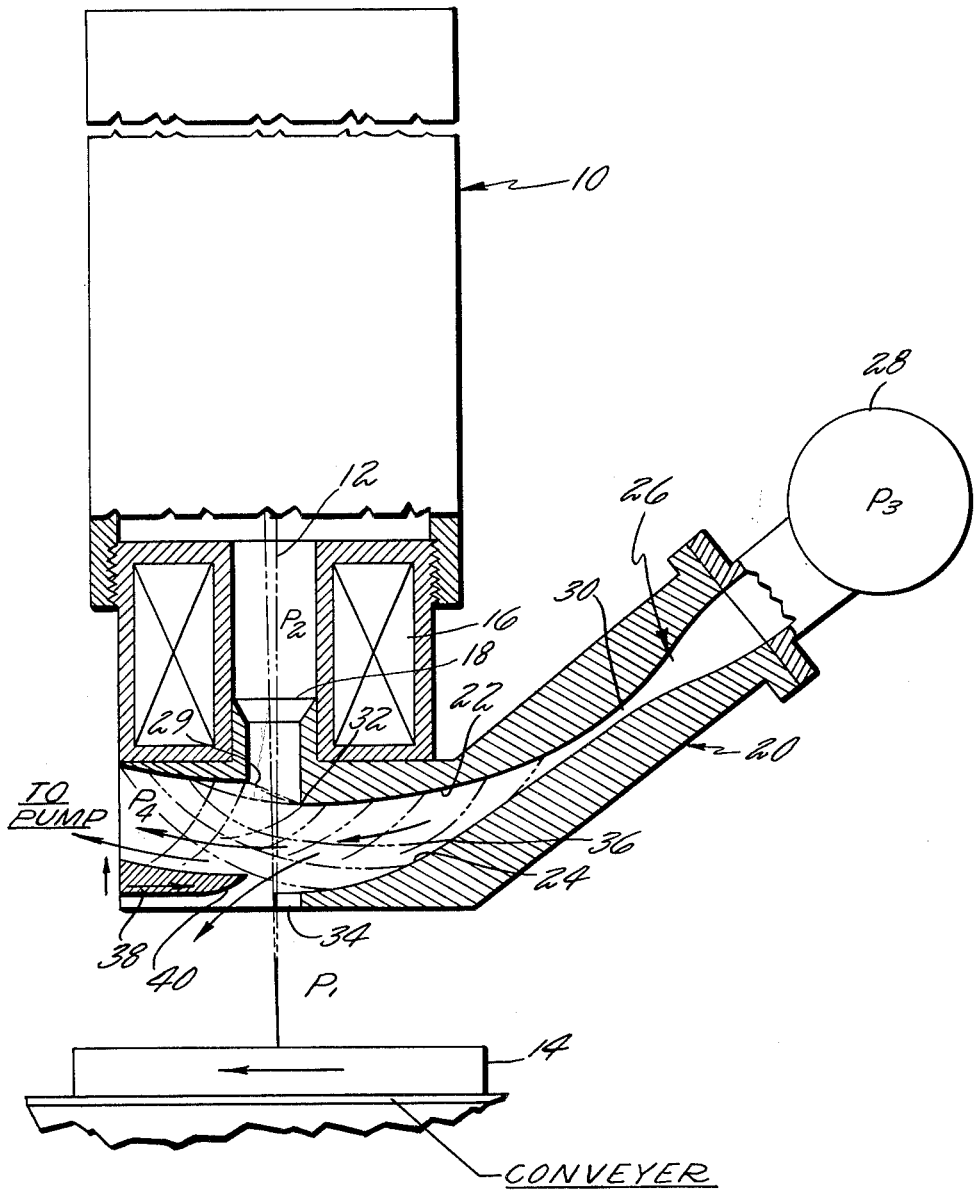
INVENTORS
ROBERT M. NIEDZIELSKI
RICHARD F. DONOVAN
BY Roger A. Van Kirk
ATTORNEY

United States Patent Office

3,175,073
Patented Mar. 23, 1965

3,175,073
SPLIT STREAM CROSS ORIFICE
Robert M. Niedzielski, Thompsonville, and Richard F. Donovan, Windsor, Conn., assignors to United Aircraft Corporation, East Hartford, Conn., a corporation of Delaware
Filed Nov. 5, 1963, Ser. No. 321,538
10 Claims. (Cl. 219—121)

This invention relates to the working of materials with a beam of charged particles. More particularly, this invention relates to performing operations such as welding, cutting, melting, evaporating, or machining on any material with an electron beam.

Devices which use the kinetic energy of an electron beam to work a material are presently commerically available. Such devices are generally known as electron beam machines. U.S. Patent No. 2,987,610, issued June 6, 1961, to K. H. Steigerwald, discloses such a machine. These machines operate by generating a highly focused beam of electrons. The electron beam is a welding, cutting and machining tool which has practically no mass but has high kinetic energy due to the fact that high momentum is imparted to the electrons. Transfer of this kinetic energy to the lattice electrons of the workpiece generates higher lattice vibrations which cause an increase in the temperature within the impingement area sufficient to accomplish work. To achieve the deep penetration of the electron beam into the work shown and discussed in the above-mentioned Steigerwald patent, it is necessary that the temperature of the workpiece at the beam impingement point become so great that at least a portion of the material vaporizes. That is, deep penetration can be achieved only by at least a partial vaporization of the workpiece.

Among the advantages of using an electron beam or the like are inertialess control and great energy concentration. However, until recently, these advantages were somewhat offset by the fact that electron beam operations had to be performed in an evacuated chamber. Working in the absence of gas was considered necessary for several reasons. First, any gas in the region surrounding the material being worked may be absorbed by and thus tend to cause impurities or irregularities in the workpiece. Secondly, and more important, the presence of gas causes scattering and attenuation of the electron beam thereby preventing the precise focusing and high power density necessary to accomplish work at one spot without material adjacent thereto being affected through heat conductivity. This scattering problem is further aggravated by the cloud of vaporized material emanating from the workpiece. Thirdly, operating an electron emitter in a vacuum of less than $10^{-4}$ Torr improves arc over characteristics and increases filament life.

As noted above, the foregoing problems formerly dictated that the working of material with a beam of charged particles be performed in an evacuated chamber. This approach, however, entailed an obvious disadvantage in that the size of the piece that could be worked with the beam was limited by the size of the chamber. For smaller parts, this restriction was acceptable but inconvenient. For extremely large parts, the cost of the vacuum chamber and associated pumps is so expensive that the process generally becomes economically unfeasible. Accompanying this problem is the inconvenience inherent in the time consuming task of pumping down the work chamber after each new workpiece is inserted therein.

It became apparent to those skilled in the art that, in cases where contamination of the workpiece was not an extremely critical problem, means should be found to bring the electron beam out of the evacuated container in which it must be generated in order to overcome the abovementioned problems and disadvantages. To accomplish the foregoing, various schemes have been proposed and, in some cases, utilized. However, these prior art methods have, with a single exception, met with little success since they still result in excessive attenuation of the beam at the relatively high energy concentrations required for working materials. Examples of such unsuccessful prior art approaches may be found in U.S. Patents No. 2,640,948; 2,816,231; 2,824,232; and 2,899,556. In most of the prior art approaches, the beam exits to the workpiece through a small aperture. From an economic standpoint, the beam exit aperture must be small in order to minimize leakage of gas into the beam generator region and to thus minimize the size and corresponding cost of the necessary vacuum pumping apparatus. Also, the beam exit aperture must, in order to minimize attenuation or the length of the path which the beam must travel through a gaseous atmosphere, be positioned relatively close to the work. As a result of the extremely high power densities involved in welding, cutting, melting, evaporating or machining any material with a beam of charged particles, both vapors and splatter emanate from the beam impingement point on the workpiece. These particles and vapors tend to collect at and thus cause rapid clogging of the small, adjacently located beam exit aperture.

Recently, a unique device known as a cross-flow orifice has been invented which will permit the transmission of the beam of charged particles from an evacuated chamber to a region of relatively high pressure without severe attenuation of the beam and leakage of environmental gas into the evacuated chamber. This novel device is the subject of copending application Serial No. 235,214, filed November 5, 1962, by Frank W. Barry, now U.S. Patent No. 3,156,811 issued November 10, 1964, and assigned to the same assignee as the present invention. The device disclosed in the Barry application will be discussed more fully below. This invention comprises an improvement to the cross-flow orifice of FIGURE 1 of the Barry application and, in particular, is directed to enhancing the novel self-cleaning feature inherent in the cross-flow orifice system.

It is therefore an object of this invention to work materials in a gaseous atmosphere with a beam of charged particles.

It is also an object of this invention to prevent clogging of an opening through which a beam of charged particles is directed at a workpiece.

It is another object of this invention to provide a protective blanket of inert gas for materials being worked with a beam of charged particles.

These and other objects of this invention are accomplished by splitting the stream of sealing gas which flows in the cross-flow orifice system in such a manner that sufficient amounts thereof will be directed out through the same opening as the beam of charged particles and will thereby force debris away from said opening.

This invention may be better understood and its numerous advantages will become apparent to those skilled in the art by reference to the accompanying drawing. In the drawing, reference numeral 10 indicates an electron beam generator. For a complete disclosure of a state of the art electron beam generator of the type being employed in commercially available welding and cutting machines and typical of those with which this invention is intended for use, reference is made to abovementioned Steigerwald U.S. Patent No. 2,987,610. As pointed out in the above-mentioned U.S. Patent No.

3,156,811 to F. W. Barry it is an object thereof and thus also of this invention to obviate the necessity of utilizing an evacuated work chamber, such as chamber 24 of FIGURE 1 of the Steigerwald patent, when working materials with an intense beam of charged particles. As is well known in the art and as shown by the Steigerwald patent, beam generator or column 10 contains means, not shown, for emitting electrons, focusing the electrons into a beam and accelerating the beam toward a workpiece. The beam formed in column 10 is indicated at 12. The workpiece, which may be two flat plates to be joined by a butt weld, is shown at 14. Workpiece 14 will, in the usual case, be in the atmosphere or a region of relatively high pressure, P1. Column 10 is evacuated and maintained at a low pressure, P2, by vacuum pumping means, not shown, of any type well known in the art. The beam generated in column 10 is focused at the workpiece by a magnetic lens assembly 16 which is supplied with current from a variable current supply, not shown. The electron beam is accelerated down column 10 and exits therefrom through an opening 18.

Interposed between workpiece 14 and column 10 is a housing or passageway defining means 20 comprising internally opposed wall surfaces 22 and 24. The surfaces 22 and 24 are arranged with respect to the axis of beam 12 so as to define a gas supply passageway 26 thereto. The inlet end of passageway 26 is connected to a source of sealing gas 28 which, in the usual case, contains an inert gas under pressure, P3. Passageway 26 terminates in a beam chamber having a beam passage aperture 29, which aperture is aligned with opening 18, in the top thereof.

In order to insure that there will be no leakage of either the sealing gas from source 28 or the environmental gas surrounding workpiece 14 into the beam generator 10, it is necessary that the pressure of the sealing gas in the region of beam passage aperture 29 in wall 22 be extremely low or, restated, this pressure should be equal to the pressure maintained at opening 18 by the vacuum pumps. In order to achieve this low pressure, a nozzle is employed to increase the velocity of the stream of sealing gas. Thus, the wall surfaces 22 and 24 cooperate to define convergent and divergent sections of a supersonic nozzle with a throat 30 therebetween. The pressure of source 28 is sufficient to provide for supersonic flow in the divergent passageway section downstream of throat 30 and across aperture 29. As shown, the discharge stream is orientated generally transversely with respect to the axis of beam 12 to provide a gaseous seal across aperture 29 and thus to prevent leakage of gas into generator 10.

As a result of the supersonic flow phenomenon produced by the expansion surface or diverging portion of upper wall 22 downstream of throat 30 and the compression surface or substantially convergent portion of lower wall 24 downstream of throat 30, the flow cross-section along the axis of beam 12 will be as follows: Expansion waves emanating from the surface 22 and particularly from adjacent the upstream lip 32 of aperture 29 provide a continually decreasing pressure region in a downstream direction or right to left as shown in the drawing. Thus the beam initially penetrates the cross flow of sealing gas in an area which is at a pressure not substantially higher than P2 or that existing in the region of opening 18 which, as stated above, is maintained at a relatively low pressure by vacuum pumps. For the foregoing reasons and since, as is well known, a fluid flowing at supersonic velocity has difficulty following sharp expansion surfaces or corners such as that presented by the upstream lip 32 of aperture 29, there will be little flow upwardly into the evacuated beam generator. The foregoing phenomenon is explained in U.S. Patent No. 2,811,828, issued to G. H. McLafferty, on November 5, 1957. Progressing downwardly along the axis beam 12 from aperture 29 to the region of a beam exit aperture 34, which aperture is defined by wall 24 and downstream member 38 and is aligned with aperture 29, the pressure will on the average progressively increase. A relatively high pressure in the region of aperture 34 results from the continued increase of pressure in the cross flow stream due to the shock waves formed on and moving from the left to right from junction point 36 on wall 24 across aperture 34. The relatively high pressure in the region of aperture 34 caused by these shock waves will prevent gas from without the casing from flowing upwardly through aperture 34. For a more detailed explanation of the operation and design of the cross-flow orifice system, reference may be had to U.S. Patent No. 3,156,811 to F. W. Barry and particularly to the explanation of FIGURE 1 thereof.

The above-described pressure gradient along the beam axis from aperture 29 to aperture 34 caused by the expansion and compression waves in the supersonic flow creates, in the manner explained, a relatively high pressure in the region of aperture 34. Due to this high pressure, some of the gas being pumped through the cross-flow orifice system will be forced downwardly through aperture 34. The amount of gas which will bleed out through opening 34 is, in part, determined by the pressure in the cross-flow orifice which pressure, as is well known in the art, is a function of the pressure, P3, of the source 28. Rather than detrimental, this inherent loss of gas out through opening 34 provides an extremely beneficial self-cleaning effect for the aperture. That is, as mentioned above, prior art attempts at bringing a working beam out of an evacuated container have been plagued with difficulties caused by splatter from the workpiece rapidly clogging the beam exit aperture. By use of the cross-flow orifice coupled with a source of sealing gas at sufficient pressure, the bleed or self-cleaning gas flow through aperture 34 tends to force debris rising from the beam impingement point on workpiece 14 away from aperture 34. This bleed flow also precipitates an added advantage of preventing contamination of the work since, if an inert gas is used in the system, the surface of the workpiece will be blanketed, as is done in tungsten inert gas welding, with such gas.

In the working of materials with a high intensity beam of charged particles it has been found that the self-cleaning effect of the cross-flow orifice system, while helpful, was not sufficient to prevent some clogging of aperture 34. Thus, it became necessary to find a method of enhancing this self-cleaning effect by devising means to increase the bleed or flow of sealing gas out through aperture 34 without adversely affecting the expansion and compression wave pattern within the cross-flow orifice. In accordance with this invention, the increased bleed is achieved through splitting the flow of sealing gas which passes through passageway 26. This flow splitting is achieved by employing an obstruction in the path of the stream of supersonic gas. In the preferred embodiment of this invention, this obstruction or flow splitter comprises member 38 which, as mentioned above, also coacts with wall 24 of housing 20 to define the downstream portion of beam exit aperture 34. Flow splitter 38 is movable, by means not shown but well known in the art, in two directions so that the amount of bleed may be varied with the operating conditions. That is, since the presence of flow splitter 38 in the stream tends to create turbulence which might affect the expansion and compression wave pattern and thus tend to cause an increase in the pressure at aperture 29, depending on the material being worked and the system pressures and pumping capacities, the location of member 38 in the stream will be adjusted to achieve the optimum compromise between the pressure at aperture 29 and the amount of vapor deflecting gases flowing outwardly through aperture 34.

As noted above, member 38 functions as an obstruction in the path of the flow stream and thus, while serving to define the exit aperture 34, also acts to divert a portion of the fluid stream from its normal flow path. The leading edge 40 of member 38 is shaped to present a sharp edge to the stream line flow thereby minimizing eddies which would create turbulence and in turn interfere with the normal flow path. That is, member 38 is shaped and positioned so that it will divert the needed amount of gas out through aperture 34 with the least amount of pressure and flow path disturbances in the supersonic stream of sealing gas. The gas which is not diverted or deflected through aperture 34 continues in the main stream and is collected downstream of member 38 by a mechanical pump, not shown. While this mechanical pump is not necessary in all cases, it has been found advantageous to use such a pump to lower the over-all system pressure.

As will be obvious from the foregoing description, the present invention permits the working of materials in a gaseous atmosphere with a beam of charged particles, overcomes the problem of clogging of the beam exit aperture and supplies a protective blanket of sealing gas for the surface of the work. While a preferred embodiment thereof has been shown and described, various modifications and substitutions may be made without deviating from the spirit and scope of this invention. For example, the flow divider element may take various forms and might be positioned at various locations within the cross-flow orifice other than the position downstream of the beam axis shown in the drawing. Thus, this invention is described by way of illustration rather than limitation and accordingly, it is understood that this invention is to be limited only by the appended claims taken in view of the prior art.

We claim:

1. In a device which generates an energized beam in a relatively low pressure region, said beam having an axis, the combination of:
   an aperture through which the beam is directed outside of said region;
   a supply of fluid under pressure;
   fluid confining means connected to said supply and including means for accelerating fluid flowing therethrough, said fluid confining means extending transversely of said axis and discharging a supersonic stream of gas adjacent said aperture, said confining means further being so contoured such as to cause generation of supersonic wave patterns and a pressure gradient, the pressure in the fluid along said axis increasing away from said region whereby the energized beam may pass out of said low pressure region without appreciable attenuation; and
   means for splitting the discharge from said fluid confining means such that a portion of the fluid is deflected at an angle to the beam axis and in a direction generally away from said aperture.

2. Apparatus for working materials with a beam of charged particles comprising:
   means for generating a beam of charged particles;
   an evacuated vessel containing at least a portion of said beam generating means and having a beam exit opening therein for transmission of the beam therethrough;
   a workpiece holding means positioned adjacent said opening externally of said vessel;
   a source of sealing gas under pressure;
   housing means positioned between said vessel and workpiece holding means and defining a gas supply passageway connected with said pressurized source of sealing gas, said passageway including gas acceleration means and having an outlet portion arranged to discharge a supersonic stream of sealing gas adjacent said vessel opening thereby generating a pressure gradient between said vessel opening and said workpiece holding means, the pressure of the gas along the beam axis increasing away from said opening, a gaseous seal for preventing leakage of gas adjacent the workpiece into said vessel thus being provided, the beam passing through said gaseous seal without appreciable attenuation, and
   means in the path of said gas downstream of said vessel opening for splitting the flow of said gas whereby a portion thereof is directed toward the workpiece.

3. Apparatus for working materials with a beam of charged particles comprising:
   means for generating a beam of charged particles;
   an evacuated vessel containing at least a portion of said beam generating means and having a beam exit opening therein for the transmission of said beam therethrough;
   housing means defining at least a portion of a second opening spaced outwardly from the said vessel opening and aligned therewith for the passage of said beam therethrough, said housing means serving also to define a chamber between said vessel opening and said second opening and to a gas supply passageway communicating at its outlet end with said chamber and extending therefrom in a direction generally transverse to a beam passing through the chamber;
   a source of sealing gas under pressure connectable with said gas supply passageway to provide for the discharge of a stream of sealing gas into said chamber from said passageway outlet, the pressure of said source being sufficient to impart supersonic velocity to the gas discharged into said chamber thereby generating a pressure gradient, the pressure in said gas increasing in a direction away from said vessel opening whereby a gaseous seal is provided across said vessel opening and the beam may be transmitted out of said evacuated vessel without appreciable attenuation; and
   means for deflecting a portion of said sealing gas out of said chamber through said second opening.

4. The apparatus of claim 3 wherein the deflecting means comprises:
   means in the path of said sealing gas for splitting the flow thereof.

5. The apparatus of claim 4 wherein the flow splitting means comprises:
   means for splitting the flow of sealing gas, said means defining the downstream edge of said second opening and having an angle of attack with respect to said flow such that a portion thereof will be diverted through said second opening.

6. Apparatus for working materials with a beam of charged particles comprising:
   means for generating an intense beam of charged particles, said beam having an axis;
   an evacuated vessel containing at least a portion of said beam generating means and having a beam exit opening therein for transmission of said beam therethrough;
   means for concentrating the beam so that it will pass through said vessel opening;
   means defining at least a part of a second opening spaced outwardly from said vessel opening and aligned therewith for the passage of said beam therethrough and defining a chamber between said second and vessel openings;
   fluid confining surface means defining a contoured gas supply passageway having a throat therein communicating at its outlet end with said chamber;
   a pressurized source of sealing gas connected with said gas supply passageway to provide a stream of gas therethrough to said chamber, the pressure of said source being sufficient to impart supersonic velocity to the passageway gas downstream of said throat whereby a compression and expansion wave pattern will be established in said chamber due to the contour of said passageway and a pressure gradient between said vessel and second openings established, the pressure increasing in a direction away from said vessel opening, the beam traversing said chamber and supersonic stream of gas without appreciable attenuation; and means in the path of said sealing gas downstream of the axis of said beam for dividing the flow passing through said chamber so that a portion thereof is diverted through said second opening.

7. The apparatus of claim 6 wherein the fluid confining surface means comprises:

an expansion surface adjacent said vessel opening, a compression surface spaced from said expansion surface and said opening, and means positioned between said source of gas and said spaced expansion and compression surfaces for defining a throat which imparts supersonic velocity to the gas flowing between said surfaces.

8. The apparatus of claim 7 wherein the flow dividing means comprises:

means in the path of said sealing gas for splitting the flow thereof.

9. The apparatus of claim 8 wherein the flow splitting means comprises:

means for splitting the flow of sealing gas, said means defining the downstream edge of said second opening and having an angle of attack with respect to said flow such that a portion thereof will be diverted through said second opening.

10. The method of working materials in a gaseous atmosphere with a beam of charged particles comprising:

generating a beam of charged particles in a region of low pressure, positioning a piece of material to be worked with the beam in a region of relatively high pressure, producing a pressure gradient between the low and high pressure regions by creating a supersonic flow of fluid between the low and high pressure regions in a direction generally transverse to the axis of the beam, directing the beam through said supersonically flowing fluid to the material to be worked, and deflecting a portion of the fluid at an angle to the axis of the beam whereby the material being worked will be blanketed by said fluid.

References Cited by the Examiner
UNITED STATES PATENTS

| | | |
|---|---|---|
| 1,638,336 | 8/27 | Himes. |
| 2,824,232 | 2/58 | Steigerwald. |
| 2,954,968 | 10/60 | Vedder _____ 98—36 |
| 3,104,310 | 9/63 | Moss _____ 219—75 |

RICHARD M. WOOD, *Primary Examiner.*

JOSEPH V. TRUHE, *Examiner.*